US011820167B2

(12) United States Patent
Kawamura et al.

(10) Patent No.: US 11,820,167 B2
(45) Date of Patent: Nov. 21, 2023

(54) WHEEL DEVICE FOR VEHICLE

(71) Applicant: HONDA MOTOR CO., LTD., Tokyo (JP)

(72) Inventors: Tetsuhiro Kawamura, Wako (JP); Naoshi Kuratani, Wako (JP); Kei Ambo, Wako (JP); Kenichi Nagatomi, Wako (JP); Shota Takigawa, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 17/205,366

(22) Filed: Mar. 18, 2021

(65) Prior Publication Data

US 2021/0291585 A1 Sep. 23, 2021

(30) Foreign Application Priority Data

Mar. 23, 2020 (JP) .................................. 2020-050815

(51) Int. Cl.
*B60B 1/06* (2006.01)
*B60B 27/00* (2006.01)

(52) U.S. Cl.
CPC ............ *B60B 1/06* (2013.01); *B60B 27/0052* (2013.01); *B60B 27/0063* (2013.01); *B60B 2900/1216* (2013.01)

(58) Field of Classification Search
CPC .... B60B 1/06; B60B 27/0052; B60B 27/0063
See application file for complete search history.

(56) References Cited

U.S. PATENT DOCUMENTS

| 6,341,825 | B1 * | 1/2002 | Inoue | .................... | B60B 7/0086 |
| | | | | | 188/264 AA |
| 2014/0175858 | A1 * | 6/2014 | Platto | ....................... | B60B 7/00 |
| | | | | | 301/37.101 |
| 2015/0008724 | A1 * | 1/2015 | Wurft | ...................... | B60B 21/02 |
| | | | | | 301/37.24 |
| 2019/0184736 | A1 * | 6/2019 | Groth | ...................... | B60B 7/063 |
| 2019/0322128 | A1 * | 10/2019 | Yen | ........................ | B60B 7/0066 |

FOREIGN PATENT DOCUMENTS

| EP | 2605920 A1 * | 6/2013 | ............ B60B 19/10 |
| JP | H03-5602 U | 1/1991 | |

* cited by examiner

*Primary Examiner* — Scott A Browne
(74) *Attorney, Agent, or Firm* — Rankin, Hill & Clark LLP (57) ABSTRACT

There is provided a wheel device for a vehicle including: a wheel having an opening formed between adjacent spokes; a brake mechanism located inside the wheel in a vehicle width direction and having a brake caliper and a brake rotor; and an arc portion extending in a circular direction in the opening and suspended between the adjacent spokes. The arc portion has a recessed portion recessed outward in the vehicle width direction inside thereof in the vehicle width direction, and the arc portion and the brake caliper are located at such positions that they overlap with each other in a state viewed in the vehicle width direction.

13 Claims, 9 Drawing Sheets

FIG. 6B
COMPARATIVE EXAMPLE

WHEEL DEVICE FOR VEHICLE

CROSS REFERENCE TO RELATED APPLICATIONS

This application claims the foreign priority benefit under Title 35, United States Code, 119 (a)-(d) of Japanese Patent Application No. 2020-050815, filed on Mar. 23, 2020 in the Japan Patent Office, the disclosure of which is herein incorporated by reference in its entirety.

BACKGROUND OF THE INVENTION

1. Technical Field

The present invention relates to a wheel device for a vehicle such as an automobile.

2. Description of Background Art

For example, a wheel for a vehicle, in which a plurality of openings are disposed in a circumferential edge portion of the wheel at substantially equal intervals in the circular direction, is disclosed in the patent document 1 (Unexamined Japanese utility model publication No. H3-5602).

BRIEF SUMMARY OF THE INVENTION

However, since a loss flow of the air outward in the width direction of the vehicle (hereinafter, vehicle width direction) through each of the plurality of openings is occurred in the wheel for a vehicle disclosed in the patent document 1, the air resistance is generated. Therefore, fuel economy may deteriorate because of the air resistance.

The present invention is for solving such a problem. And it is an object of the present invention to provide a wheel device for a vehicle capable of reducing the air resistance.

In order to achieve the object, the present invention provides a wheel device for a vehicle, the wheel device comprising: a wheel including a rim where a tire fits, a hub to be attached to a vehicle shaft, and a plurality of spokes each of which connects the rim and the hub, and openings formed between adjacent spokes of the plurality of spokes; a brake mechanism located inside the wheel in a vehicle width direction and including a brake caliper and a brake rotor; and an arc portion extending in a circular direction in an opening of the openings and suspended between the adjacent spokes, wherein the arc portion comprises a recessed portion recessed outward in the vehicle width direction inside the arc portion in the vehicle width direction, and wherein at least one of the brake caliper and the brake rotor is located at such a position that the at least one overlaps with the arc portion in a state viewed in the vehicle width direction.

According to the present invention, a wheel device for a vehicle capable of reducing the air resistance can be provided.

BRIEF DESCRIPTION OF THE SEVERAL VIEWS OF THE DRAWING

Certain preferred embodiments of the present invention will now be described in greater detail by way of example only and will reference to the accompanying drawings, in which.

DETAILED DESCRIPTION OF THE INVENTION

A first, a second and a third embodiments of the present invention will be described in detail properly with reference to the attached drawings. Note that, in each figure, directions shown by "front" and "rear" means a front-rear direction of the vehicle, directions shown by "left" and "right" means the vehicle width direction (left-right direction), and directions shown by "upper" and "lower" means an upper-lower direction of the vehicle (vertical direction).

Figure 1:
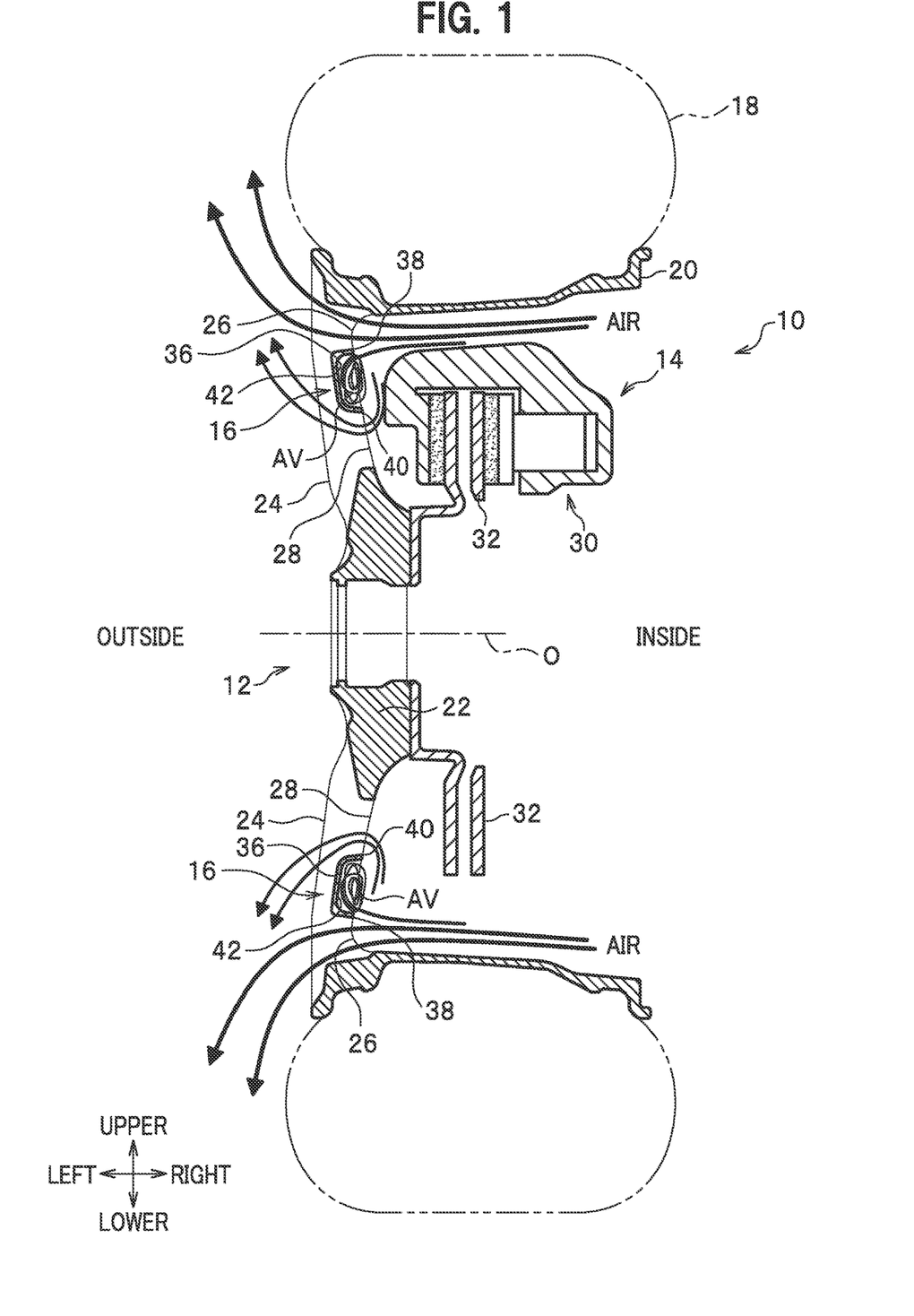
FIG. 1 is a cross sectional view showing a schematic structure of a wheel device for a vehicle according to a first embodiment of the present invention.
Figure 2:
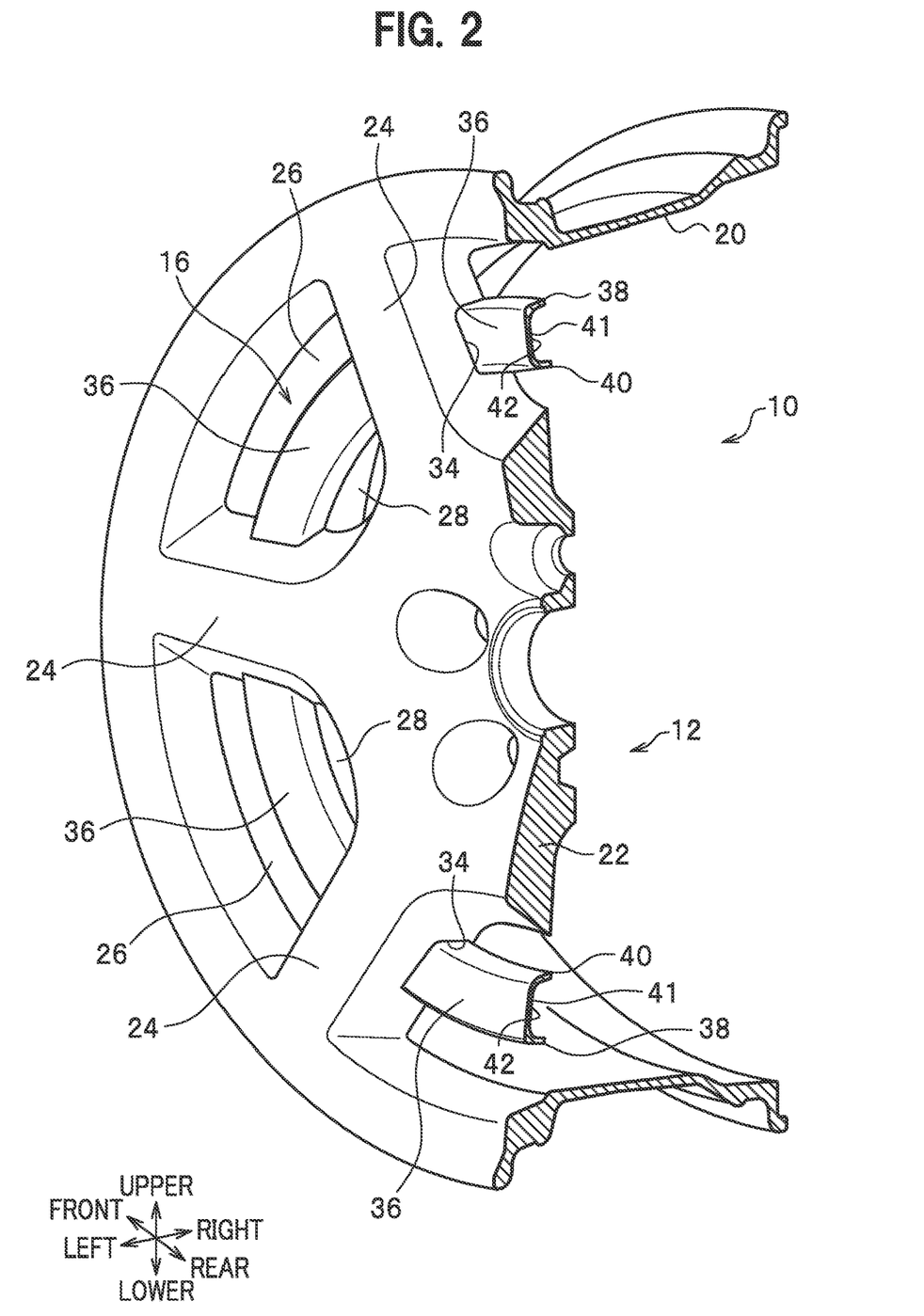
FIG. 2 is a partially broken perspective view of the wheel device for a vehicle shown in FIG. 1.

As shown in FIG. 1, a wheel device 10 for a vehicle according to a first embodiment of the present invention is provided with a wheel 12, a brake mechanism 14, and a ring body 16 (refer to FIG. 2). Note that, thick arrow lines and thin solid arrow lines show air flows in FIG. 1.

As shown in FIGS. 1 and 2, the wheel 12 has a rim 20 where a tire 18 fits on the outer circumference of the rim 20, a hub 22 to be attached to a vehicle shaft not shown, and a plurality of spokes 24 each of which connects the rim 20 on the radial outer side and the hub 22 on the radial inner side. An opening is formed between adjacent two spokes 24. Each opening is divided into two of a radial outer opening 26 and a radial inner opening 28 by the ring body 16 extending in a circular direction. The radial outer opening 26 is located on the radial outer side, and the radial inner opening 28 is located on the radial inner side. An area of the radial outer opening 26 is larger than an area of the radial inner opening 28.

The brake mechanism 14 is located inside the wheel 12 in the vehicle width direction, and is provided with a brake caliper 30 and a brake rotor 32 which are known. The brake caliper 30 is fixed to a member belonging to the vehicle body side and not shown, and has a plurality of pistons not shown inside the brake caliper 30. And the brake rotor 32 has a circular plate shape and is provided to rotate together with the wheel 12.

The ring body 16 extends in the circular direction between the rim 20 and the hub 22. Further, the ring body 12 is attached to groove portions 34 each having a rectangular shape in a cross section and formed on the inner side of each spoke 24 in the vehicle width direction (refer to FIG. 2). The ring body 16 extends in the circular direction in each opening, and has a plurality of arc portions 36 each of which is suspended between corresponding adjacent spokes 24. Furthermore, a cross section of the ring body 16 in a radial direction of the wheel 12 has the shape of a "U" letter laid laterally. The ring body 16 is configured to have an outer portion 38 on a radially outer side, an inner portion 40 on a radially inner side, and a connecting portion 41 connecting the outer portion 38 and the inner portion 40. The connecting portion 41 extends in a direction roughly orthogonal to both the outer portion 38 and the inner portion 40 in the cross section. In the first embodiment, the ring body 16 is configured to have a plurality of arc portions 36 each of which is connected to the corresponding adjacent arc portions to form a perfect circle. However, for example, the ring body 16 may be composed of separated plural arc portions 36. That is, in this case, each arc portion 36 is not connected to the corresponding adjacent arc portions 36. Further, the ring body 16 does not have to be formed in an annulus.

Figure 3A:
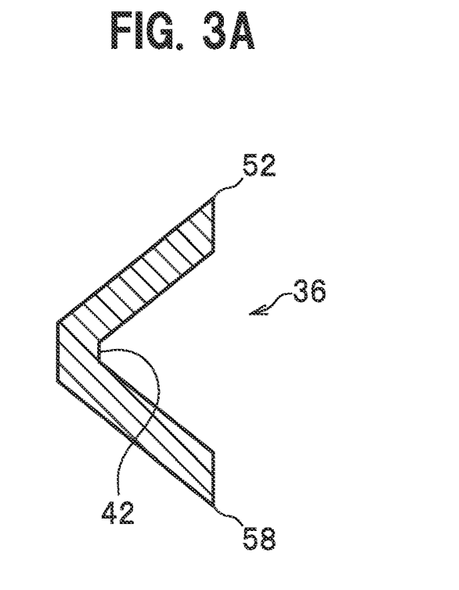
FIG. 3A is an enlarged cross sectional view showing a modified example of an arc portion.
Figure 3B:
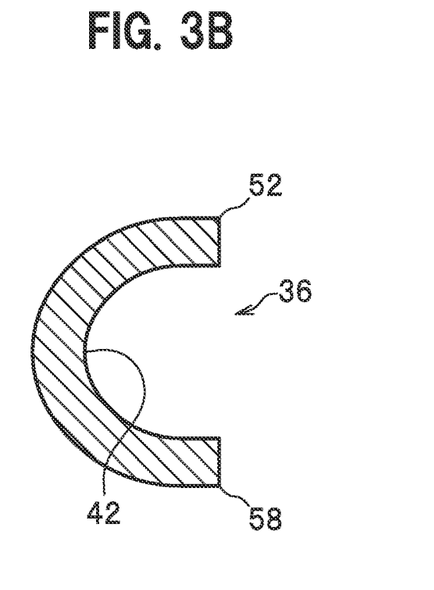
FIG. 3B is an enlarged cross sectional view showing another modified example of the arc portion.

Further, the cross sectional shape of each of the arc portions 36 in the radial direction is not limited to the shape of the "U" letter laid laterally, and, for example, as shown by the modified examples illustrated in FIGS. 3A, 3B, may be formed in the shape of a "<" symbol or "C" letter. Furthermore, the cross sectional shape of each of the arc portions 36 in the radial direction may be, for example, a composite polygon. By forming in such a shape, the degree of freedom in design can be improved. In addition, a reference numeral 42 in FIGS. 3A, 3B denotes the recessed portion described below.

A recessed portion 42 recessed outward in the vehicle width direction is provided inside the arc portion 36 in the vehicle width direction. The outer portion 38 and the inner portion 40 are disposed facing each other with the recessed portion 42 therebetween. Further, the corresponding arc portion 36 of the ring body 16 and the brake caliper 30 (outer portion in the radial direction) of the brake mechanism 14 are disposed at positions overlapping with each other in a state viewed in the vehicle width direction (refer to FIG. 1).

In the first embodiment, since each arc portion 36 is disposed in the corresponding opening, the opening area of the opening is reduced by the area of the arc portion 36. Hereby, in the first embodiment, the air inside the wheel 12 can be restrained from flowing to the outside of the wheel 12 in comparison with the conventional structure. For this reason, in the first embodiment, the air resistance can be reduced in comparison with the conventional structure.

Figure 6A:
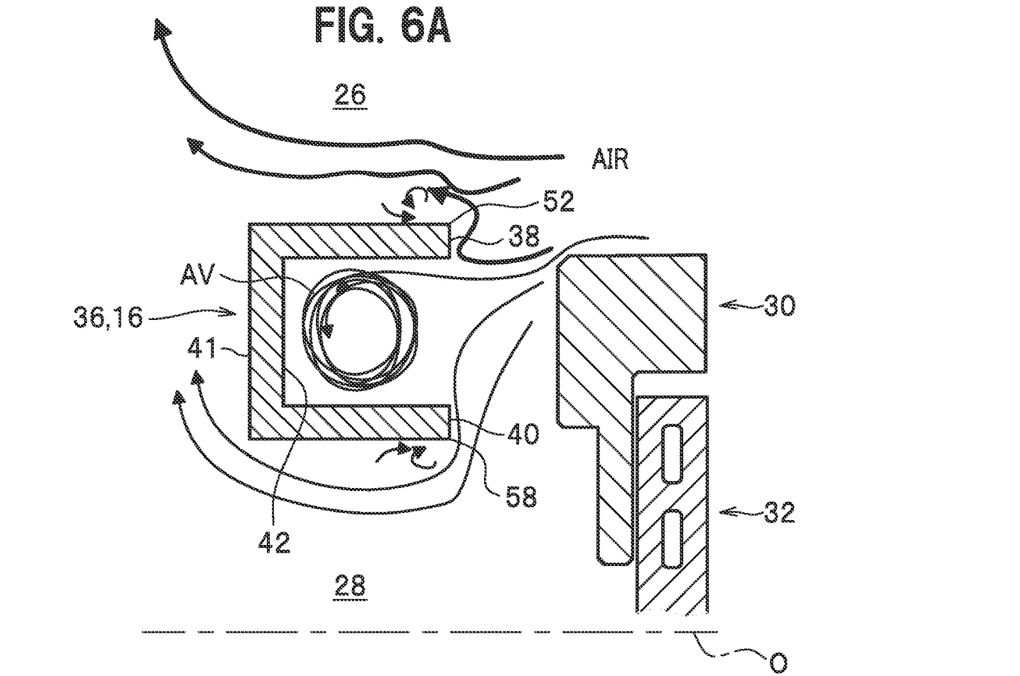
FIG. 6A is a schematic cross sectional view showing an operation and effect of an edge formed on the arc portion in the first embodiment.

Further, in the first embodiment, when the air tries to flow outward through the openings of the wheel 12, a part of the air enters the recessed portion 42 of each arc portion 36, so that an air vortex AV is generated in the recessed portion 42 (refer to FIGS. 1, 6A). As a result, in the first embodiment, the air vortex AV changes the flow of the other air, so that the amount of air flowing out of the wheel 12 can be reduced.

In the first embodiment, since the arc portion 36 and the brake caliper 30 are disposed at such positions that they overlap with each other in a state viewed in the vehicle width direction, the separation distance between the arc portion 36 and the brake caliper 30 can be made small. For this reason, in the first embodiment, the amount of air flowing out of the wheel 12 through the radial inner opening 28 is small. Consequently, the energy loss can be reduced, so that the air resistance can be reduced. Note that, in the first embodiment, the arc portion 36 and the brake caliper 30 are disposed at such positions that they overlap with each other in a state viewed in the vehicle width direction. However, the positions of the arc portion 36 and the brake caliper are not limited to those. For example, the brake rotor 32 may be disposed at such a position that the brake rotor 32 overlaps with the arc portion 36 in a state viewed in the vehicle width direction.

Figure 9:
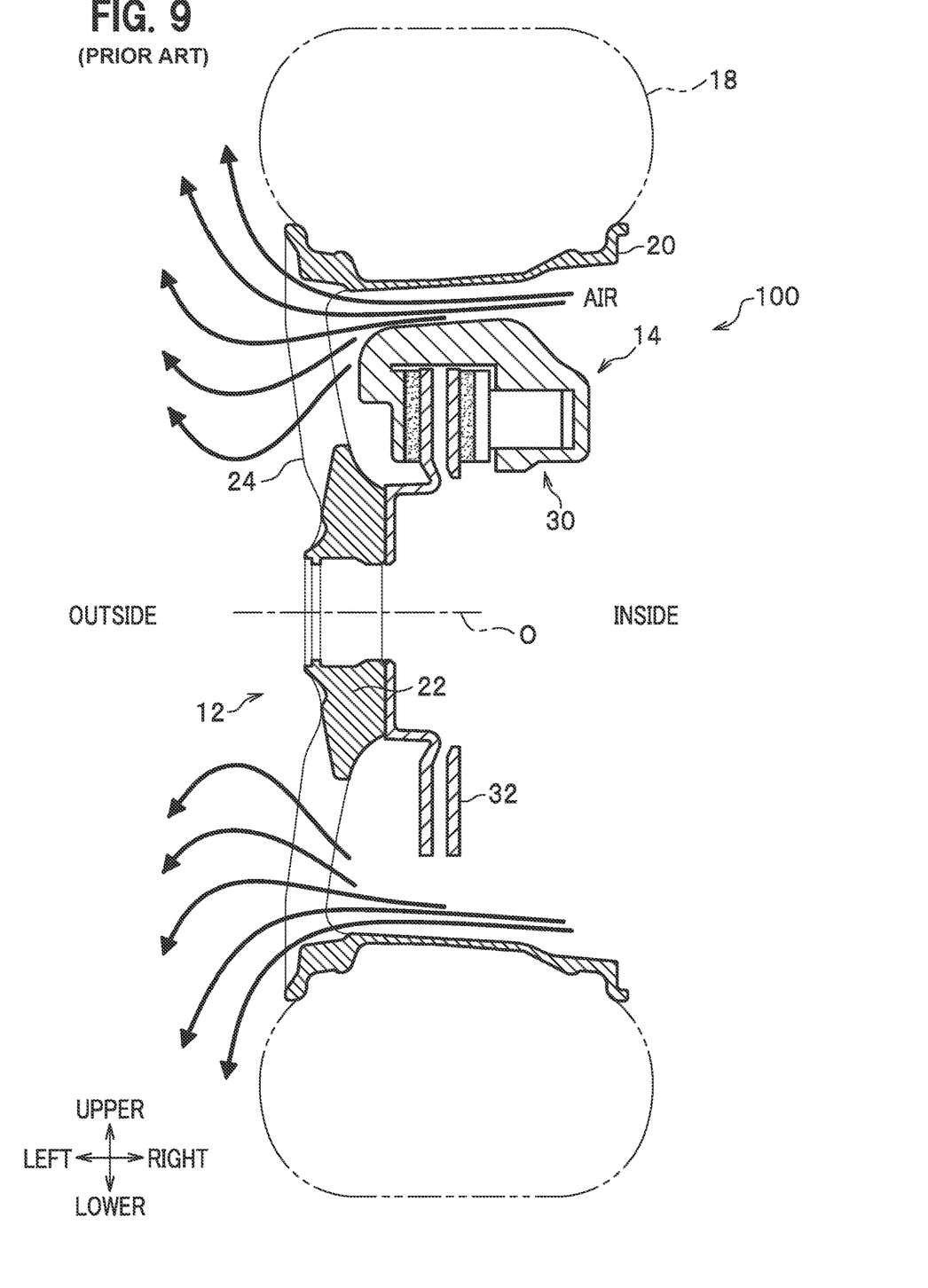
FIG. 9 is a cross sectional view showing a schematic structure of a wheel device for a vehicle according to a comparative example devised by the applicant.
Figure 10:
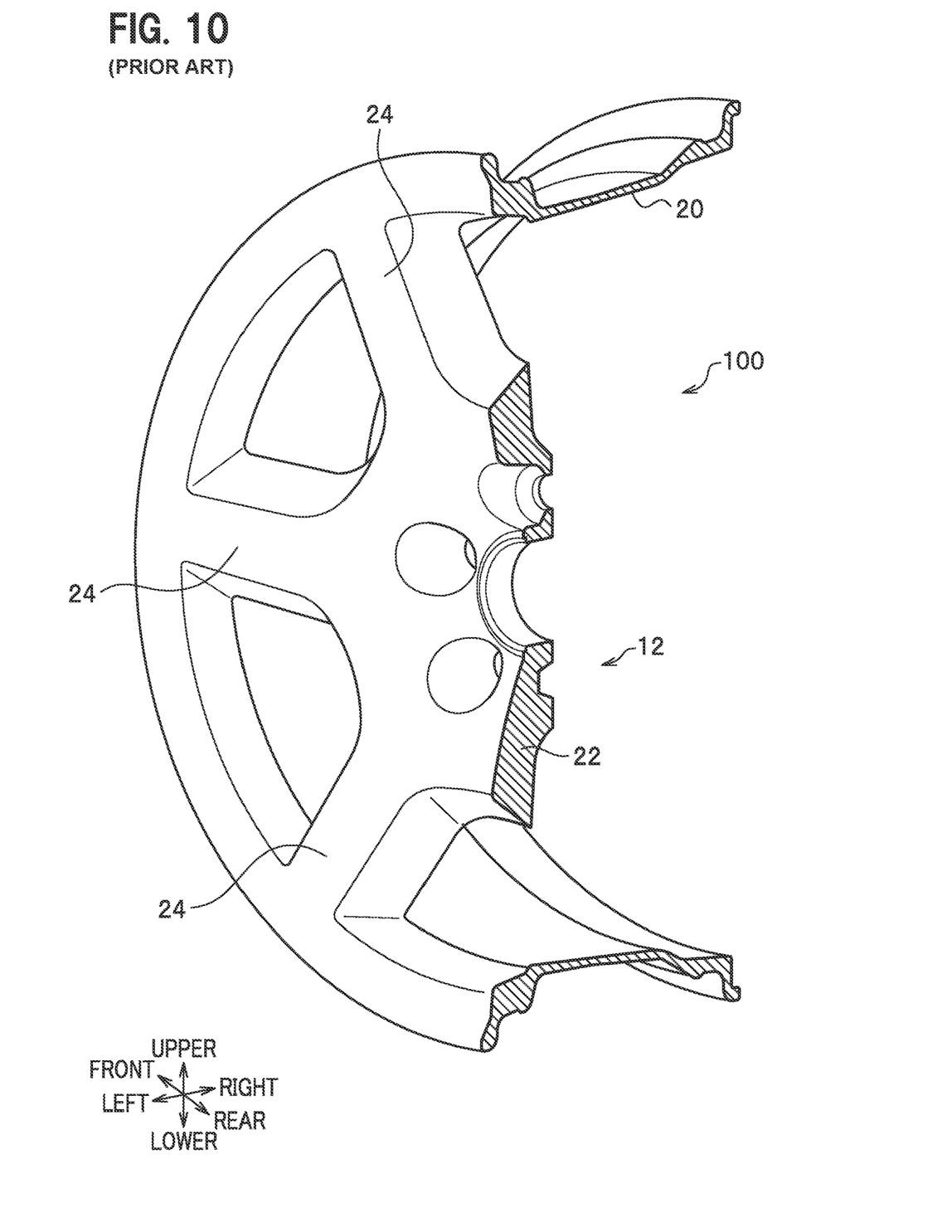
FIG. 10 is a partially broken perspective view of the wheel device for a vehicle shown in FIG. 9.

FIG. 9 is a cross sectional view showing a schematic structure of a wheel device for a vehicle according to a comparative example devised by the applicant, and FIG. 10 is a partially broken perspective view of the wheel device for a vehicle shown in FIG. 9. In addition, in FIG. 9, thick arrow lines show air flows flowing to the outside.

The wheel device 100 for a vehicle according to the comparative example differs from the wheel device 10 for a vehicle according to the first embodiment in that the ring body 16 (arc portions 36) is not provided. Since the other structures are the same as the wheel device 10 for a vehicle, the same elements will be described with the same reference symbols.

As shown in FIGS. 9, 10, the wheel device 100 for a vehicle according to the comparative example does not have the arc portions 36, so that the opening area of the openings of the wheel 12 is larger than that in the first embodiment. For this reason, in the comparative example, the air inside the wheel 12 is easily flown to the outside through the openings in comparison with the first embodiment (refer to the thick arrow lines in FIG. 9). Consequently, it is difficult for the comparative example to reduce the air resistance in comparison with the first embodiment.

Figure 4:
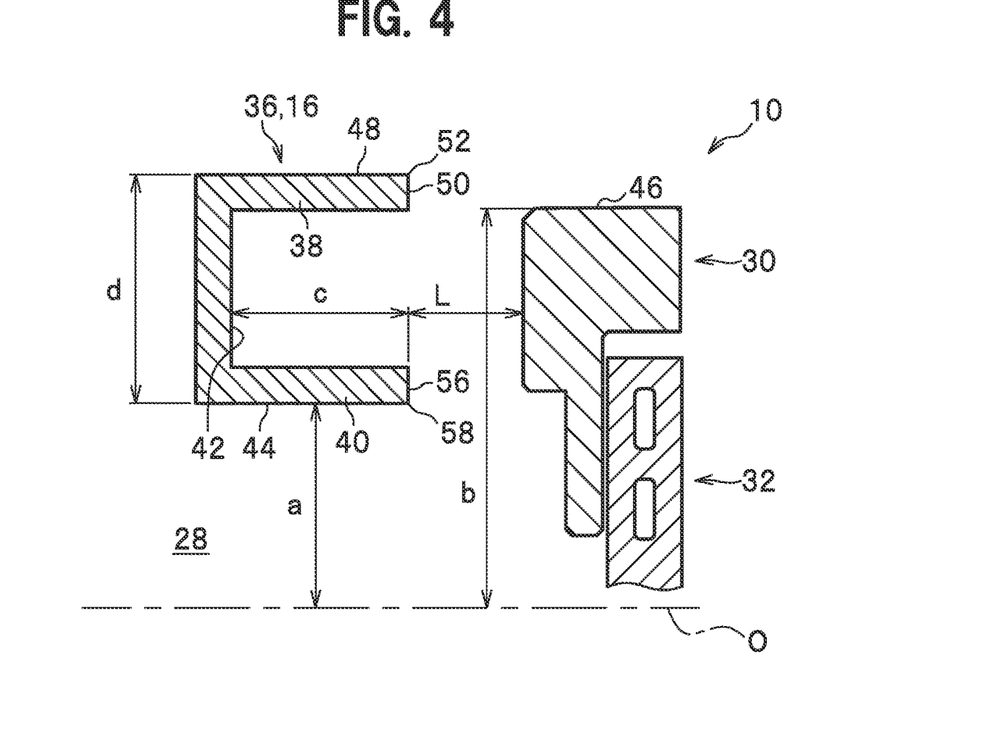
FIG. 4 is a schematic explanation view showing a relationship between a distance "a" between an inner circumferential face of an inner portion and a central axis of the wheel and a distance "b" between an outer peripheral face of a brake caliper and the central axis of the wheel.

As shown in FIG. 4, in the first embodiment, a distance "a" between an inner circumferential face 44 of the inner portion 40 and a central axis O of the wheel 12 and a distance "b" between an outer peripheral face 46 of the brake caliper and the central axis O of the wheel 12 are set so that a≤b. Thus, in the first embodiment, by setting the distances "a" and "b" so as to satisfy that a≤b, the opening area of the radial inner opening 28 is further reduced by the brake caliper 30. As a result, in the first embodiment, the air is restrained from flowing to the outside through the radial inner opening 28.

Figure 5:
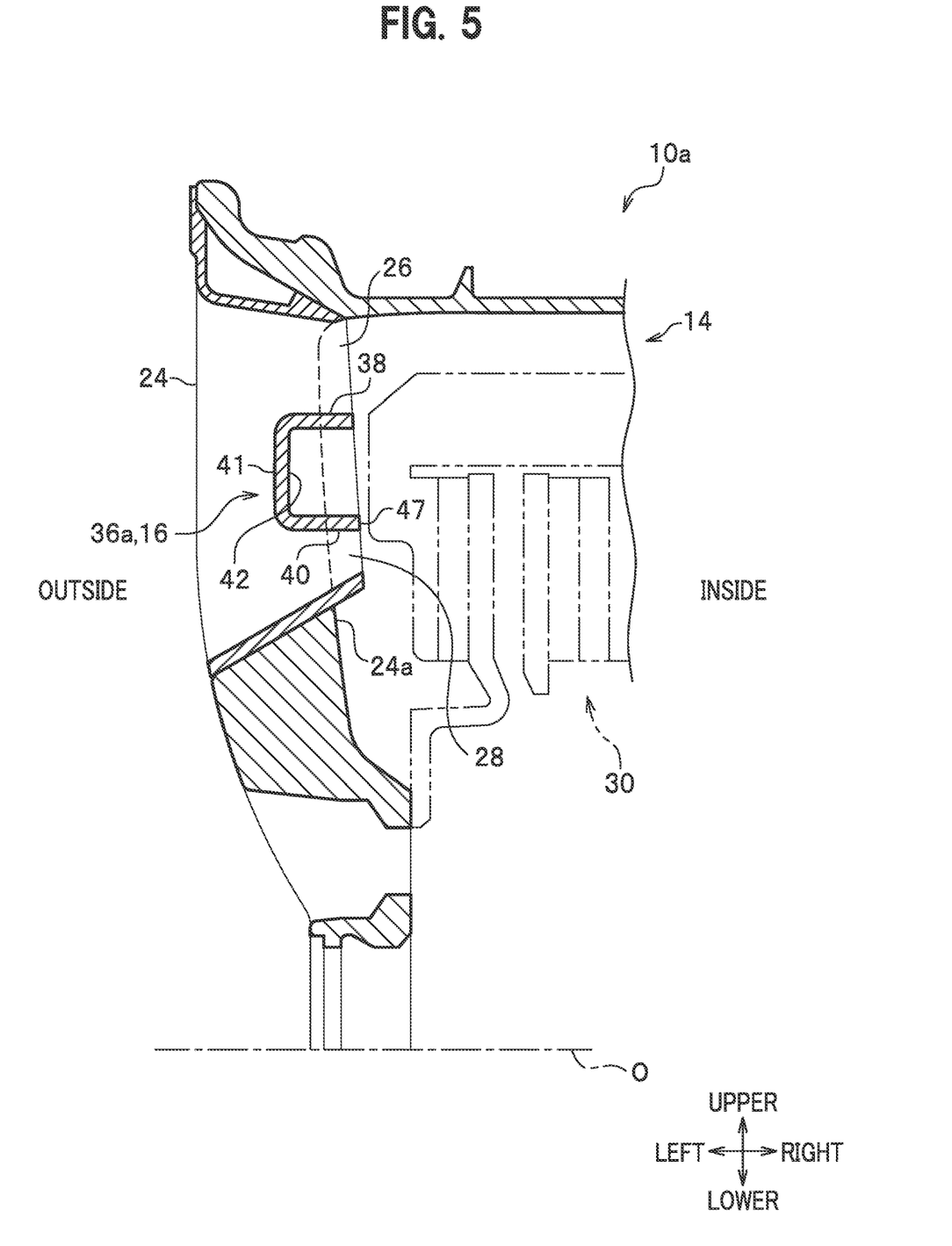
FIG. 5 is a cross sectional view showing a structure of a wheel device for a vehicle according to a second embodiment.

As shown in FIG. 5, a wheel device 10a for a vehicle according to a second embodiment has a projecting portion 47 that at least a portion of an arc portion 36a projects inward in the vehicle width direction further than an inner end 24a of the corresponding spoke 24. In the first embodiment shown in FIG. 1, there exists no portion corresponding to the projecting portion 47. In general, a distance between the arc portion 36a and the brake caliper 30 in the vehicle width direction can be freely set. In the second embodiment, by having the projecting portion 47 being a portion of the arc portion 36a and projecting inward, the distance between the arc portion 36a and the brake caliper 30 in the vehicle width direction can be reduced. As a result, it becomes hard for the air to flow between the arc portion 36a and the brake caliper 30. That is, the air can be restrained from flowing to the outside of the wheel through the radial inner opening 28, so that the air resistance can be reduced.

As shown in FIG. 4, in the first embodiment, at the arc portion 36, an edge 52 is formed at the border where an outer circumferential face 48 of the outer portion 38 and an inner face 50 of the outer portion 38 in the vehicle width direction meet. In the first embodiment, by forming the edge 52, the air bounces when the air separates at the edge 52 (refer to the thick arrow line in FIG. 6A). Hereby, the air flowing to the outside through the radial outer opening 26 and the air bounced at the edge 52 interfere with each other, so that the air is hard to flow to the outside through the radial outer opening 26.

Figure 6B:
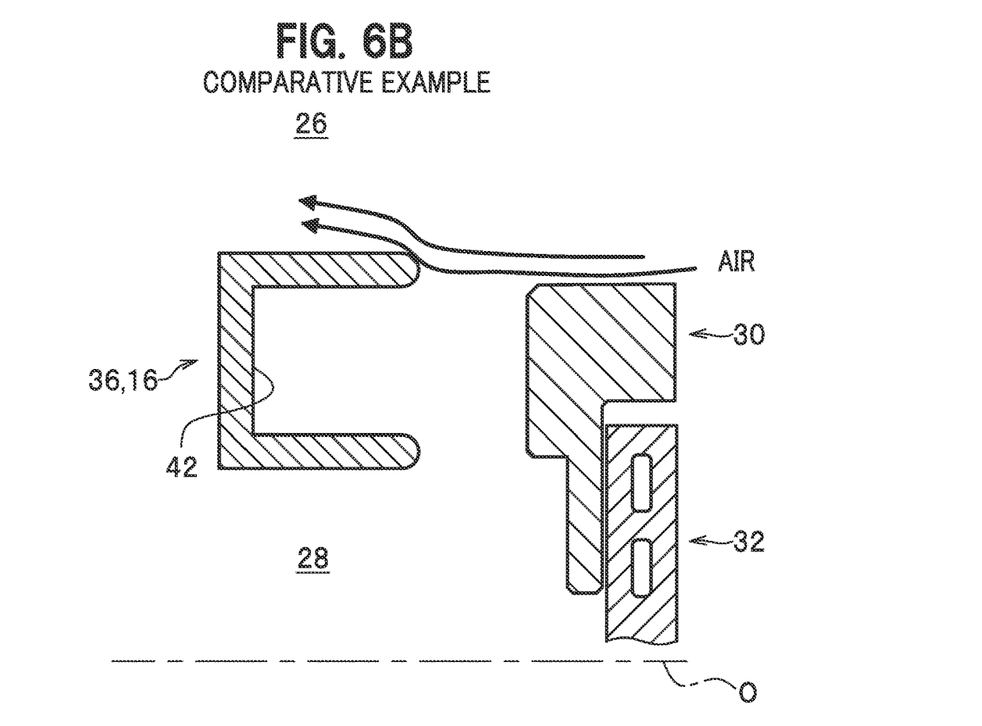
FIG. 6B is a schematic cross sectional view showing an operation and effect of a comparative example having no edge.

FIG. 6B is a schematic cross sectional view of a comparative example including an arc portion having no edge. As shown in FIG. 6B, at the curved face like an arc in a cross section, the air does not bounce, so that the air is hard to interfere with the other air flow (refer to the thick arrow line in FIG. 6B). That is, at the arc portion 36 having no edge according to the comparative example, the air does not bounce and does not interfere with the other air flow either. For this reason, in the comparative example, the effect of restraining the air from flowing to the outside is small in comparison with that in the first embodiment having the edge.

As shown in FIG. 4, in the first embodiment, at the arc portion 36, an edge 58 is formed at the border where the inner circumferential face 44 of the inner portion 40 and an inner face 56 of the inner portion 40 in the vehicle width direction intersect each other. In the first embodiment, by forming the edge 58, the air flowing outside through the radial inner opening 28 and the air bounced at the edge 58 interfere with each other, so that the air is hard to flow to the outside through the radial inner opening 28. Note that, "edge" means a corner portion provided by two planes orthogonal to each other. In addition, for the sake of manufacturing or desired considerations, chamfering (R surface) may be done.

In the first embodiment, each of cross sections of the edges 52, 58 is formed in a right-angled shape (refer to FIGS. 4, 6A). The right angle of the cross sections of the edges 52, 58 is the optimal angle to get the bounce effect of the air separated from the vicinity of each edge, so that in the first embodiment, the bounced air interferes with the air flowing to the outside to restrain the air from flowing out (refer to FIG. 6A).

As shown in FIG. 4, in the first embodiment, a distance "d" between the outer circumferential face 48 of the outer portion 38 and the inner circumferential face 44 of the inner portion 40 is set equal to or more than 10 mm, and a depth "c" of the recessed portion 42 in the vehicle width direction is set equal to or more than 13 mm. In the first embodiment, by setting the dimensions as described above, the air vortex AV can be appropriately generated inside the recessed portion 42.

In the first embodiment, a distance "L" between the arc portion 36 and the brake caliper 30 in the vehicle width direction is set to 14.8 mm to 42.8 mm. In the first embodiment, this distance is optimal in that the air is restrained from flowing out of the wheel 12 by letting the flow of a part of the air interfere with the flow of other parts of the air.

Figure 7:
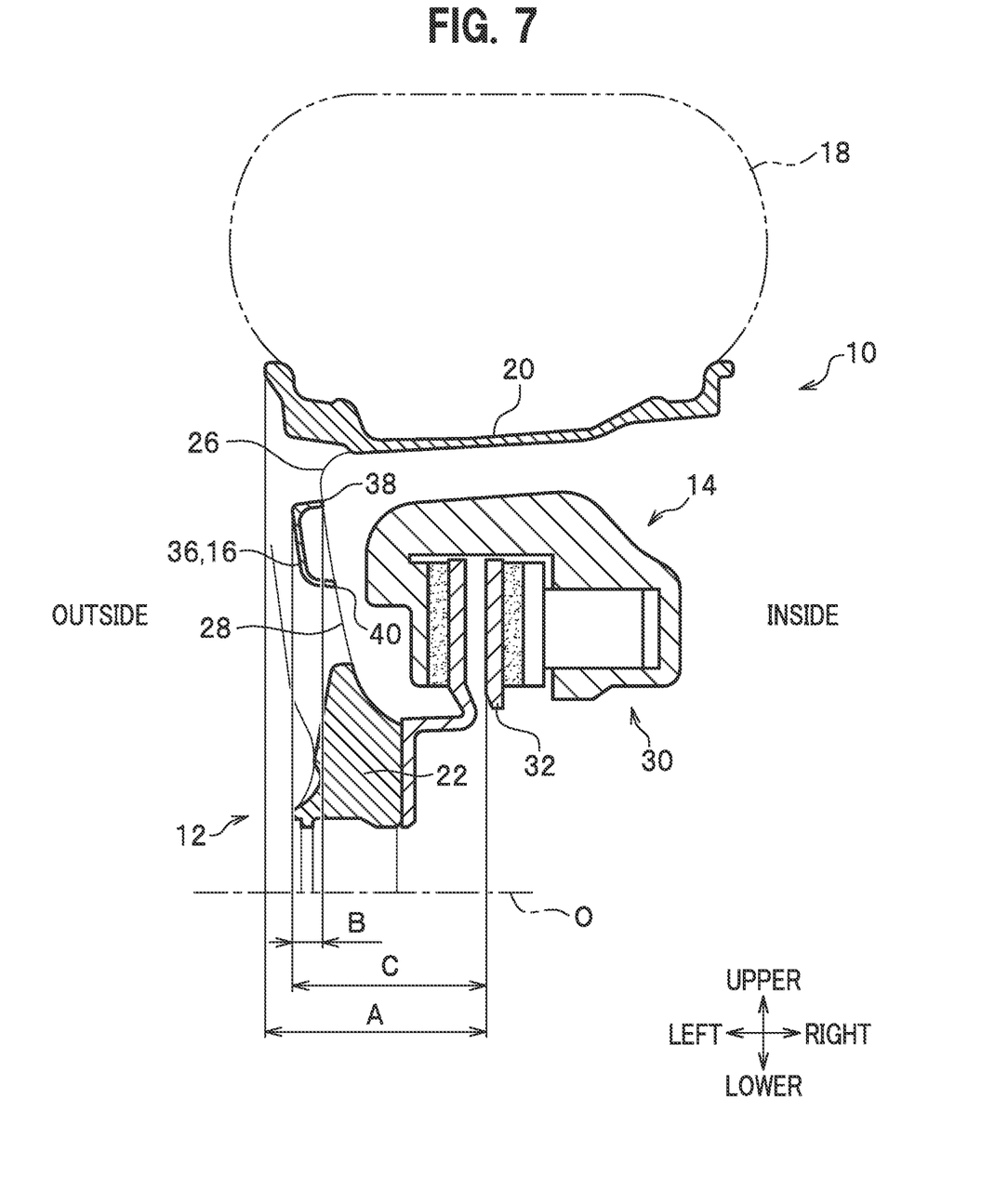
FIG. 7 is an explanation view showing a relationship among a distance "A" between an outer edge of a rim in the vehicle width direction and an outer face of a brake rotor in the vehicle width direction, a distance "B" between an outer face of an outer portion in the vehicle width direction and an inner face of the outer portion in the vehicle width direction, and a distance "C" between an outer face of the arc portion in the vehicle width direction and the outer face of the brake rotor in the vehicle width direction.

As shown in FIG. 7, the wheel device 10 for a vehicle defines a distance "A" between an outer edge of the rim 20 of the wheel 12 in the vehicle width direction and an outer face of the brake rotor 32 in the vehicle width direction, a distance "B" between an outer face of the outer portion 38 in the vehicle width direction and the inner face of the outer portion 38 in the vehicle width direction, and a distance "C" between an outer face of the arc portion 36 in the vehicle width direction and an outer face of the brake rotor 32 in the vehicle width direction. These three distances are st to satisfy the following equations: $C/A \times 100 \leq 81\%$, and $B/A \times 100 \leq 15\%$. Hereby, a depth dimension of the recessed portion 42 of the arc portion 36 can be set optimal in the first embodiment.

Figure 8:
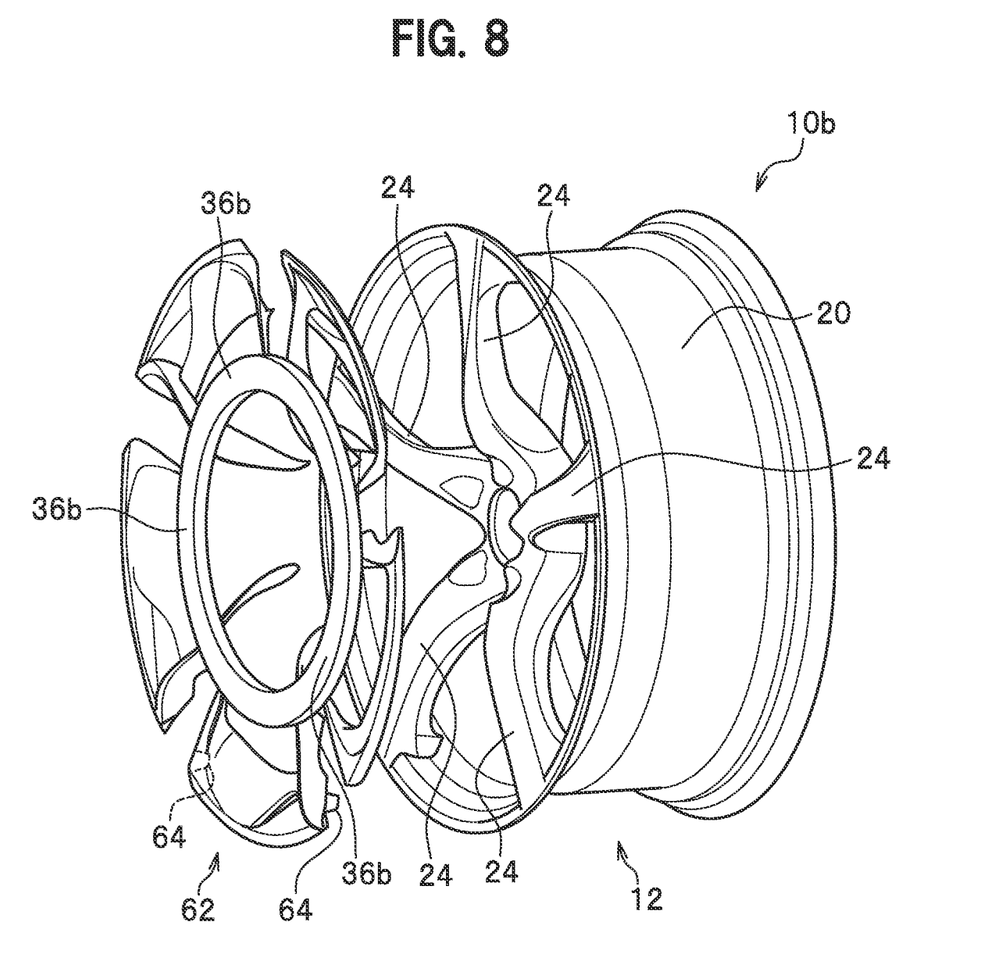
FIG. 8 is an exploded perspective view of a wheel device for a vehicle according to a third embodiment.

FIG. 8 is an exploded perspective view of a wheel device for a vehicle according to a third embodiment.

In the wheel device 10b for a vehicle according to the third embodiment, an arc portion 36b is formed of a plastic member separated from the wheel 12. The arc portion 36b is joined to a plastic cover 62. The plastic cover 62 has a pair of claws 64 to be engaged with spokes 24. The arc portion 36b is fixed to the wheel 12 via the plastic cover 62. However, the arc portion 36b may be molded using resin together with the plastic cover 62, or may be formed separately from the plastic cover 62 and connected to the plastic cover 62 via a connecting device not shown.

In general, a back face of the wheel 12 is lathed, so that it is technically hard to project only the arc portion inward in the vehicle width direction. However, by resin-molding the arc portion 36b separately from the wheel 12 like the wheel device 10b for a vehicle according to the third embodiment, it is easy to project only the arc portion 36b inward in the vehicle width direction.

DESCRIPTION OF REFERENCE NUMERALS 10, 10a, 10b Wheel device for vehicle
12 Wheel
14 Brake mechanism
18 Tire
20 Rim
22 Hub
24 Spoke
26 Radial outer opening (Opening)
28 Radial inner opening (Opening)
30 Brake caliper
32 Brake rotor
36, 36a, 36b Arc portion
38 Outer portion
40 Inner portion
42 Recessed portion
44 Inner circumferential face
46 Outer circumferential face
52 Outer portion edge, Edge
58 Inner portion edge, Edge
AV Air vortex
O Central axis

What is claimed is:

1. A wheel device for a vehicle, the wheel device comprising:
   a wheel including a rim where a tire fits, a hub to be attached to a vehicle shaft, and a plurality of spokes each of which connects the rim and the hub, and openings formed between adjacent spokes of the plurality of spokes;
   a brake mechanism located inside the wheel in a vehicle width direction and including a brake caliper and a brake rotor; and an arc portion arced about the hub in a circular direction in one of the openings and suspended by the adjacent spokes, wherein the arc portion comprises a recessed portion which is recessed outward in the vehicle width direction inside the arc portion in the vehicle width direction and which includes an outer portion on a radially outer side and an inner portion on a radially inner side facing the outer portion across the recessed portion, wherein at least one of the brake caliper and the brake rotor is located at such a position that the at least one overlaps with the arc portion in a state viewed in the vehicle width direction, and wherein the outer portion and the inner portion extend inward in the vehicle width direction.

2. The wheel device for a vehicle according to claim 1, wherein a relationship between a distance "a" and a distance "b" is set to that a≤b, the distance "a" being a distance between an inner circumferential face of the inner portion and a central axis of the wheel, the distance "b" being a distance between an outer peripheral face of the brake caliper and the central axis of the wheel.

3. The wheel device for a vehicle according to claim 1, wherein at least a portion of the arc portion projects inward in the vehicle width direction further than an inner end of a corresponding one of the plurality of spokes in the vehicle width direction.

4. The wheel device for a vehicle according to claim 2, wherein at least a portion of the arc portion projects inward in the vehicle width direction relative to an inner end of a corresponding one of the plurality of spokes in the vehicle width direction.

5. The wheel device for a vehicle according to claim 2, wherein an outer portion edge is formed at a border where an outer circumferential face of the outer portion and an inner face of the outer portion in the vehicle width direction meet.

6. The wheel device for a vehicle according to claim 2, wherein an inner portion edge is formed at a border where the inner circumferential face of the inner portion and an inner face of the inner portion in the vehicle width direction intersect each other.

7. A wheel device for a vehicle, the wheel device comprising:
a wheel including a rim where a tire fits, a hub to be attached to a vehicle shaft, and a plurality of spokes each of which connects the rim and the hub, and openings formed between adjacent spokes of the plurality of spokes;
a brake mechanism located inside the wheel in a vehicle width direction and including a brake caliper and a brake rotor; and
an arc portion extending in a circular direction in one of the openings and suspended between the adjacent spokes,
wherein the arc portion comprises a recessed portion recessed outward in the vehicle width direction inside the arc portion in the vehicle width direction,
wherein at least one of the brake caliper and the brake rotor is located at such a position that the at least one overlaps with the arc portion in a state viewed in the vehicle width direction,
wherein the arc portion includes an outer portion on a radially outer side and an inner portion on a radially inner side facing the outer portion across the recessed portion,
wherein a relationship between a distance "a" and a distance "b" is set to that a≤b, the distance "a" being a distance between an inner circumferential face of the inner portion and a central axis of the wheel, the distance "b" being a distance between an outer peripheral face of the brake caliper and the central axis of the wheel, wherein an outer portion edge is formed at a border where an outer circumferential face of the outer portion and an inner face of the outer portion in the vehicle width direction meet, and wherein a cross section of the outer portion edge is formed in a right-angled shape.

8. The wheel device for a vehicle according to claim 6, wherein a cross section of the inner portion edge is formed in a right-angled shape.

9. The wheel device for a vehicle according to claim 2, wherein a distance "d" between an outer circumferential face of the outer portion and the inner circumferential face of the inner portion is equal to or more than 10 mm, and
wherein a depth "c" of the recessed portion in the vehicle width direction is equal to or more than 13 mm.

10. The wheel device for a vehicle according to claim 1, wherein a distance "L" between the arc portion and the brake caliper is set to 14.8 mm to 42.8 mm.

11. The wheel device for a vehicle according to claim 2, wherein a distance "L" between the arc portion and the brake caliper is set to 14.8 mm to 42.8 mm.

12. A wheel device for a vehicle, the wheel device comprising:
a wheel including a rim where a tire fits, a hub to be attached to a vehicle shaft, and a plurality of spokes each of which connects the rim and the hub, and openings formed between adjacent spokes of the plurality of spokes;
a brake mechanism located inside the wheel in a vehicle width direction and including a brake caliper and a brake rotor; and
an arc portion extending in a circular direction in one of the openings and suspended between the adjacent spokes,
wherein the arc portion comprises a recessed portion recessed outward in the vehicle width direction inside the arc portion in the vehicle width direction,
wherein at least one of the brake caliper and the brake rotor is located at such a position that the at least one overlaps with the arc portion in a state viewed in the vehicle width direction,
wherein the arc portion includes an outer portion on a radially outer side and an inner portion on a radially inner side facing the outer portion across the recessed portion,
wherein a relationship between a distance "a" and a distance "b" is set to that a≤b, the distance "a" being a distance between an inner circumferential face of the inner portion and a central axis of the wheel, the distance "b" being a distance between an outer peripheral face of the brake caliper and the central axis of the wheel, and
wherein a distance "A", a distance "B", and a distance "C" are set so as to satisfy that $C/A \leq 0.81$ and $B/A \leq 0.15$, the distance "A" being a distance between an outer edge of the rim of the wheel in the vehicle width direction and an outer face of the brake rotor in the vehicle width direction, the distance "B" being a distance between an outer face of the outer portion in the vehicle width direction and an inner face of the outer portion in the vehicle width direction, the distance "C" being a distance between an outer face of the arc portion in the vehicle width direction and an outer face of the brake rotor in the vehicle width direction.

13. The wheel device for a vehicle according to claim 1, wherein the arc portion is formed of a plastic member separated from the wheel, and fixed to the wheel.

* * * * *